United States Patent
Croak et al.

(10) Patent No.: US 8,130,932 B1
(45) Date of Patent: Mar. 6, 2012

(54) METHOD AND APPARATUS FOR IMPLEMENTING A NETWORK ELEMENT IN A COMMUNICATIONS NETWORK

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1427 days.

(21) Appl. No.: 11/322,975

(22) Filed: Dec. 30, 2005

(51) Int. Cl.
*H04M 7/00* (2006.01)

(52) U.S. Cl. ........ 379/219; 709/220; 709/221; 709/222; 379/201.01

(58) Field of Classification Search .................. 379/352; 709/223; 370/352
See application file for complete search history.

(56) References Cited

U.S. PATENT DOCUMENTS

| | | | |
|---|---|---|---|
| 5,629,513 A * | 5/1997 | Geronimi et al. | 235/492 |
| 5,802,159 A * | 9/1998 | Smolentzov et al. | 379/201.03 |
| 6,718,384 B2 * | 4/2004 | Linzy | 709/224 |
| 6,901,440 B1 * | 5/2005 | Bimm et al. | 709/223 |
| 2004/0064582 A1 * | 4/2004 | Raghunath et al. | 709/240 |
| 2005/0152513 A1 * | 7/2005 | Pence et al. | 379/88.01 |

OTHER PUBLICATIONS

Seacord, Robert C., Replaceable Components and the Service Provider Interface, Jan. 1, 2002, Springer Berlin/Heidelberg, vol. 2255/2002, pp. 222-232.*

* cited by examiner

*Primary Examiner* — Ahmad Matar
*Assistant Examiner* — Jirapon Intavong

(57) ABSTRACT

A method and apparatus for implementing a network element in a communications network are described. In one example, a set of service provider defined interfaces are defined, wherein each of the service provider defined interfaces is associated with a network element class. The set of service provider defined interfaces is then provided to a manufacturer of a particular network element class. Afterwards, a new network element from the manufacturer having the set of service provider defined interfaces is implemented in the communications network.

17 Claims, 4 Drawing Sheets

200

METHOD AND APPARATUS FOR IMPLEMENTING A NETWORK ELEMENT IN A COMMUNICATIONS NETWORK

BACKGROUND OF THE INVENTION

1. Field of the Invention

Embodiments of the present invention generally relate to telecommunications systems and, more particularly, to a method and apparatus for implementing a network element in a communications network, such as a packet network, e.g., a voice over internet protocol (VoIP) network.

2. Description of the Related Art

Generally, telecommunications systems provide the ability for two or more people or machines (e.g., computerized or other electronic devices) to communicate with each other. A telecommunications system may include various networks for facilitating communication that may be generally organized into packet networks and circuit-switched networks. An exemplary circuit-switched network includes a plain old telephone system (POTS), such as the publicly switched telephone network (PSTN). Exemplary packet networks include internet protocol (IP) networks, asynchronous transfer mode (ATM) networks, frame-relay networks, and the like. One type of packet network is a voice-over-internet protocol (VoIP) network.

Due to the relative immaturity of the technology that is supported, network providers (e.g., VoIP network providers) are often confronted with the need to replace components in their infrastructure. New components often provide better performance per specific unit costs, and/or offer superior features and capabilities. Although replacing technology components can provide benefits to the network provider, it frequently is quite costly in respect to time and money to add the necessary operations support when new technology is deployed.

Thus, there is a need in the art for a method and apparatus for implementing a network element.

SUMMARY OF THE INVENTION

In one embodiment, a method and apparatus for implementing a network element in a communications network are described. Specifically, a set of service provider defined interfaces are defined, wherein each of the service provider defined interfaces is associated with a network element class. The set of service provider defined interfaces is then provided to a manufacturer of a particular network element class. Afterwards, a new network element from the manufacturer having the set of service provider defined interfaces is implemented in the communications network.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
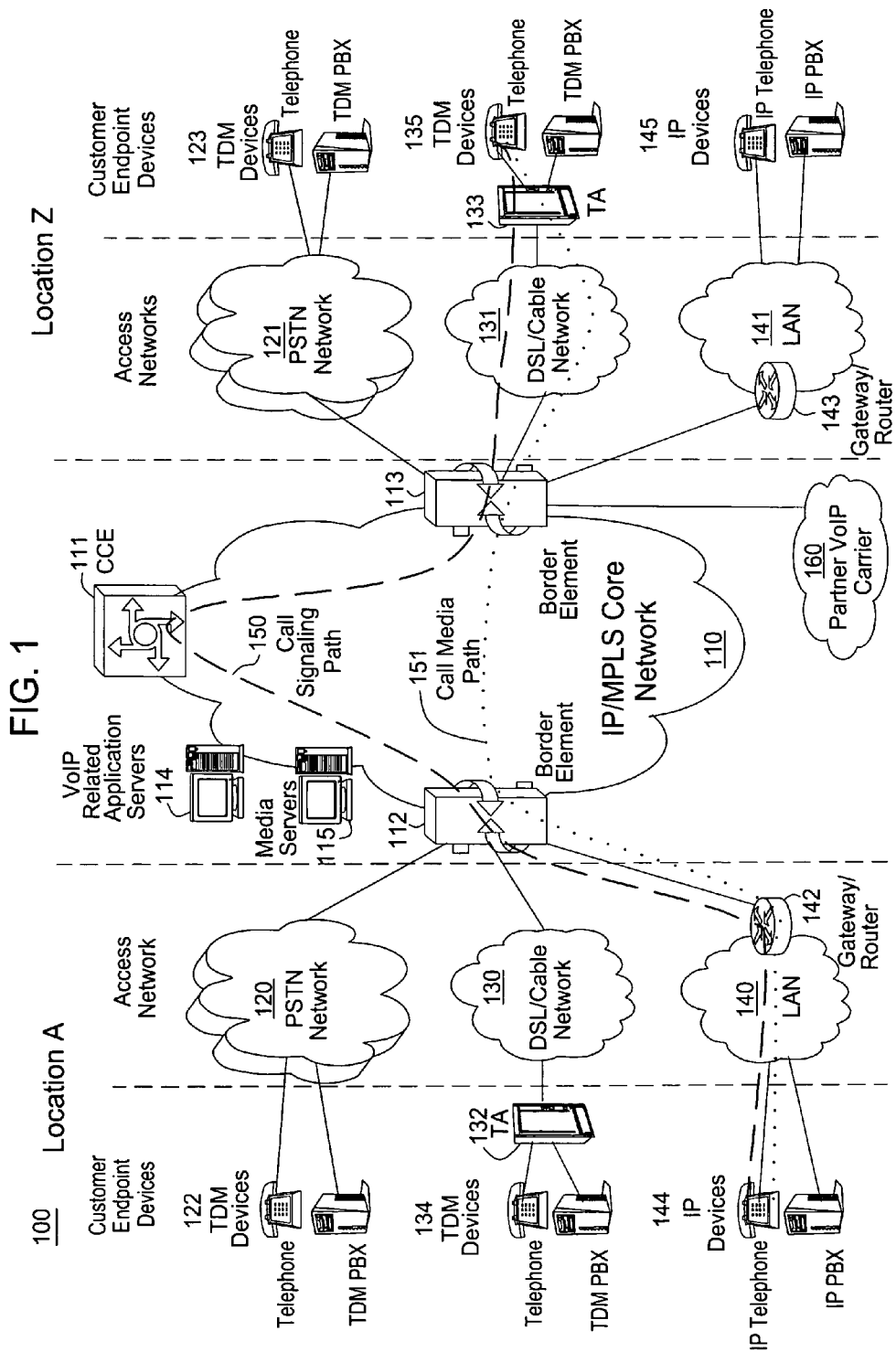
FIG. 1 is a block diagram depicting an exemplary embodiment of a communication system in accordance with the invention.

To better understand the present invention, FIG. 1 illustrates communication architecture 100 having an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a SIP back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Figure 2:
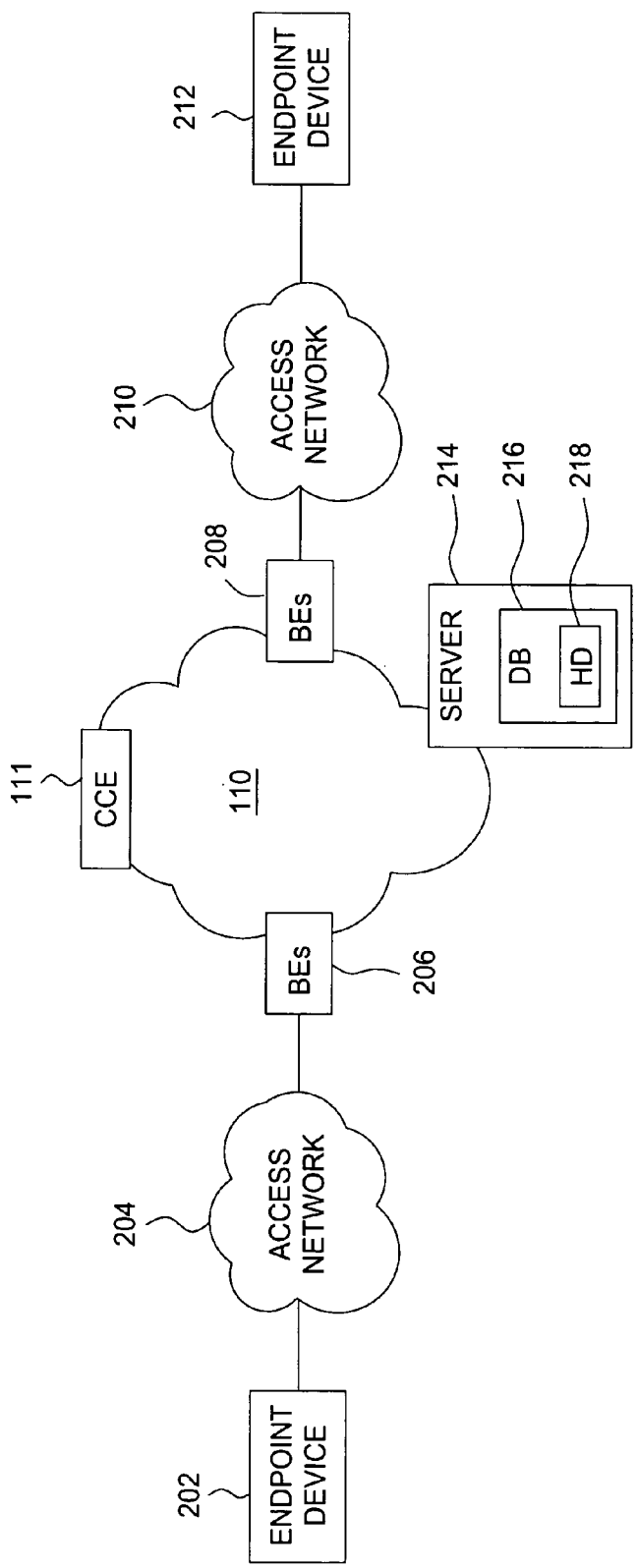
FIG. 2 is a block diagram depicting an exemplary configuration of the communication system of FIG. 1 constructed in accordance with one or more aspects of the invention.

FIG. 2 is a block diagram depicting an exemplary configuration of the communication system of FIG. 1 constructed in accordance with one or more aspects of the invention. An endpoint device 202 is configured for communication with the core network 110 via an access network 204 and at least one border element (BE) 206. An endpoint device 212 is configured for communication with the core network 110 via an access network 210 and at least one BE 208. The endpoint device 202 and the endpoint device 212 may comprise any of the customer endpoint devices described above (e.g., TDM devices, IP devices, etc.). The access networks 204 and 210 may comprise any of the access networks detailed above (e.g., PSTN, DSL/Cable, LAN, etc).

The core network 110 further includes an operational support system (OSS) server 214. Notably, the server 214 may be configured to provide alarming, provisioning, capacity, and performance monitoring for the components of the network 110. In one embodiment, the server 214 supports a suite of programs that enables the service provider to monitor, analyze, and manage the network 110.

The present invention allows a service provider to replace (or add) network components without changing the standard interfaces being used by certain portions of the existing network (e.g., OSS). In one embodiment, a set of service provider defined interfaces enables new network components to communicate with a service provider's existing OSS. Notably, the OSS systems providing monitoring functions for these network components do not have to change as a result of the new deployed network technologies. Specifically, both the new network components and the surrounding operation support system are configured to support the set of interfaces specified. In one exemplary scenario, the network provider needs to deploy a new network element into the core network 110. In order to provide compatibility between the new network element and the existing OSS, the network provider supplies a manufacturer with an interface specification to be followed. Notably, the interface specification comprises a set of service provider defined interfaces that will enable the new network element to communicate with the OSS system (e.g., a monitoring server).

In one embodiment, the set of server provider defined interfaces provide a plurality of necessary interfaces that enable proprietary network elements to communicate with an existing OSS. Notably, each interface in the set is associated with a particular class of network elements, such as a BE, a CCE, a core element (e.g., router within the network that facilitates signaling between other network elements only), an application server, and the like. For instance, the interface specification provided to a vendor may require a newly manufactured BE to be capable of performing certain functionalities that are required by all of the service provider's BEs. These requirements are contained in the server provider defined interface for the BE "class." For example, the service provider may require all BEs to transmit every fifth alarm message to the monitoring server 214. This requirement is therefore encoded in the set of interfaces provided to the manufacturer. Similarly, the service provider may require every BE to monitor its own call flow volume capacity. For example, the BE may be configured to send a provisioning alert message to the monitoring server 214 in the event that 90% of the BE's resources have been utilized during at least 22 of the last 24 hours (thus, indicating the impending need for a new border element).

Once the manufacturer has completed the construction process, the network element may be inserted into the service provider's network. Notably, the set of interfaces will enable the new component to communicate with the network's existing OSS system. In one embodiment, the set of service provider defined interfaces may be contained in an element manager (EM) module 230 that is located in the new network component. In one embodiment, the EM 230 may comprise a software program supported by each network component.

Figure 3:
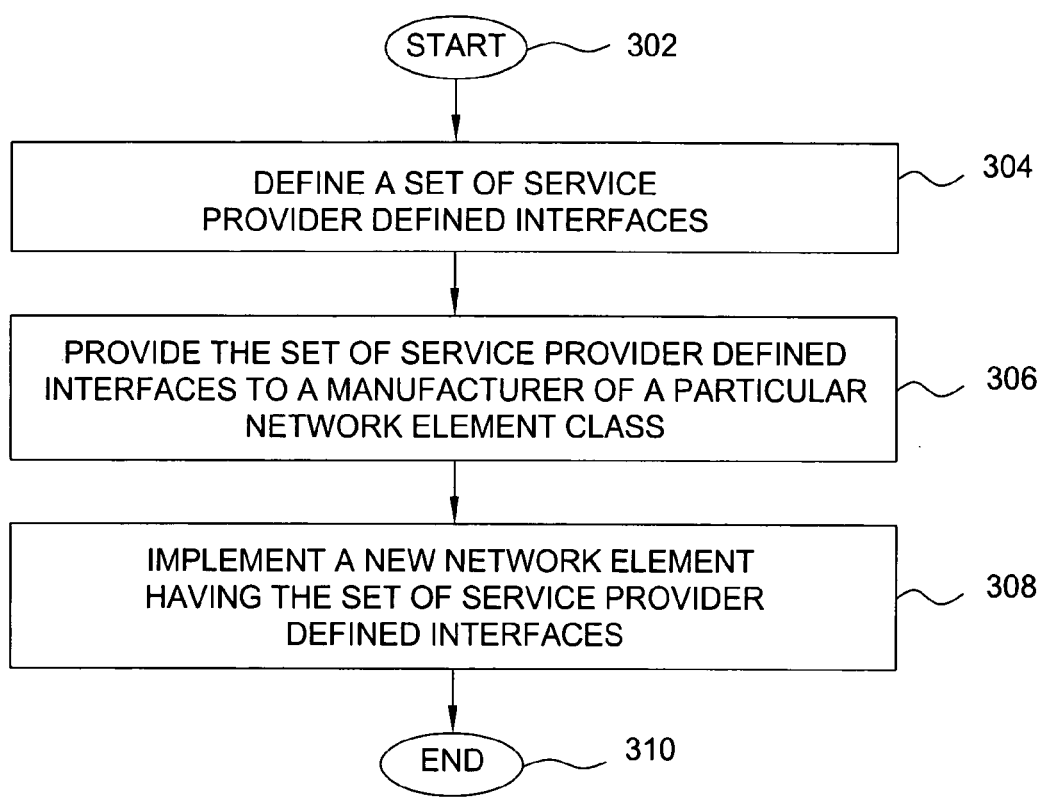
FIG. 3 is a flow diagram depicting an exemplary embodiment of a method for implementing a network element in accordance with one or more aspects of the invention.

FIG. 3 is a flow diagram depicting an exemplary embodiment of a method 300 for processing request for implementing a network element in a communications network as related to one or more aspects of the invention. The method 300 begins at step 302 and proceeds to step 304 where a set of service provider defined interfaces are defined. In one embodiment, a service provider defines a set of interfaces that enable a new network component to communicate with an OSS. Notably, each of the service provider defined interfaces is associated with a unique network element class.

At step 306, the set of service provider defined interfaces are provided to a manufacturer of a particular network element class. In one embodiment, a service provider provides an interface specification to a vendor or manufacturer of network components. The vendor subsequently constructs a network component having a set of service provider defined interfaces in accordance to the interface specification.

At step 308, a new network element from the manufacturer having the set of service provider defined interfaces is implemented into the communications network. In one embodiment, the service provider obtains the new network component from the vendor and inserts it into the network. The new network component will not experience any communication difficulties due to the provisioned set of service provider defined interfaces located on the network element. The method 300 ends at step 310.

Figure 4:
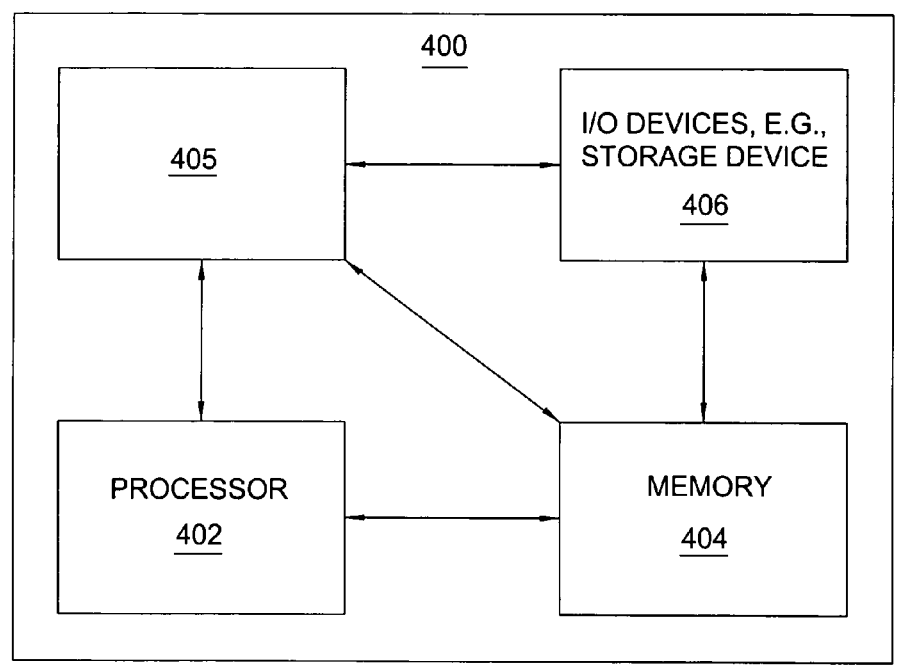
FIG. 4 is a block diagram depicting an exemplary embodiment of a computer suitable for implementing the processes and methods described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for implementing a network element, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASICs), a general purpose computer or any other hardware equivalents. In one embodiment, the present module or process 405 for implementing a network element can be loaded into memory 404 and executed by processor 402 to implement the functions as discussed above. As such, the present process 405 for implementing a network element (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The invention claimed is:

1. A method performed by a processor in a communications network, comprising:
   defining by the processor a set of service provider defined interfaces, wherein each of the service provider defined interfaces is defined for a network element class, wherein each of the service provider defined interfaces enables network elements of the network element class to communicate with an operating support system server of the communications network, wherein the network element class comprises a border element class;
   providing by the processor the set of service provider defined interfaces to a manufacturer of border elements of the border element class; and
   deploying by the processor a new border element from the manufacturer having the set of service provider defined interfaces in the communications network for supporting a service in the communications network.

2. The method of claim 1, wherein the communications network comprises an Internet protocol network.

3. The method of claim 2, wherein the internet protocol network comprises a service over internet protocol network.

4. The method of claim 1, wherein the deploying comprises:
   replacing an existing network element in the communications network with the new border element.

5. The method of claim 1, wherein the deploying comprises:
   supplementing an existing network element in the communications network with the new border element.

6. The method of claim 1, wherein the set of service provider defined interfaces is contained in an electronic manager.

7. A non-transitory computer readable medium having stored thereon a plurality of instructions, the plurality of instructions including instructions which, when executed by a processor, causes the processor to perform a method in a communications network, comprising:
   defining a set of service provider defined interfaces, wherein each of the service provider defined interfaces is defined for a network element class, wherein each of the service provider defined interfaces enables network elements of the network element class to communicate with an operating support system server of the communications network, wherein the network element class comprises a border element class;
   providing the set of service provider defined interfaces to a manufacturer of border elements of the border element class; and
   deploying a new border element from the manufacturer having the set of service provider defined interfaces in the communications network for supporting a service in the communications network.

8. The non-transitory computer readable medium of claim 7, wherein the communications network comprises an internet protocol network.

9. The non-transitory computer readable medium of claim 8, wherein the internet protocol network comprises a service over internet protocol network.

10. The non-transitory computer readable medium of claim 7, wherein the deploying comprises:
    replacing an existing network element in the communications network with the new border element.

11. The non-transitory computer readable medium of claim 7, wherein the deploying comprises:

supplementing an existing network element in the communications network with the new border element.

12. The non-transitory computer readable medium of claim 7, wherein the set of service provider defined interfaces is contained in an electronic manager.

13. An apparatus for use in a communications network, comprising:
a processor configured to:
define a set of service provider defined interfaces, wherein each of the service provider defined interfaces is associated with a network element class, wherein each of the service provider defined interfaces enables network elements of the network element class to communicate with an operating support system server of the communications network, wherein the network element class comprises a border element class; and
provide the set of service provider defined interfaces to a manufacturer of border elements of the border element class, wherein a new border element from the manufacturer having the set of service provider defined interfaces is deployed in the communications network.

14. The apparatus of claim 13, wherein the communications network comprises an internet protocol network.

15. The apparatus of claim 14, wherein the internet protocol network comprises a service over internet protocol network.

16. The apparatus of claim 13, wherein the new border element replaces an existing network element in the communications network.

17. The apparatus of claim 13, wherein the new border element supplements an existing network element in the communications network.

* * * * *